April 6, 1965 T. B. NORLING ETAL 3,177,290

LOCAL PREPAY PAYSTATION WITH DELAYED CALL PROVISIONS

Filed Dec. 21, 1961

INVENTORS
T.B. NORLING
M.A. JACOBS
BY [signature]
ATTORNEY 3,177,290
Patented Apr. 6, 1965

3,177,290
LOCAL PREPAY PAYSTATION WITH DELAYED CALL PROVISIONS

Thomas B. Norling and Melvin A. Jacobs, Chicago, Ill., assignors to International Telephone and Telegraph Corporation, New York, N.Y., a corporation of Maryland Filed Dec. 21, 1961, Ser. No. 161,095
10 Claims. (Cl. 179—6.3)

Figure 1:
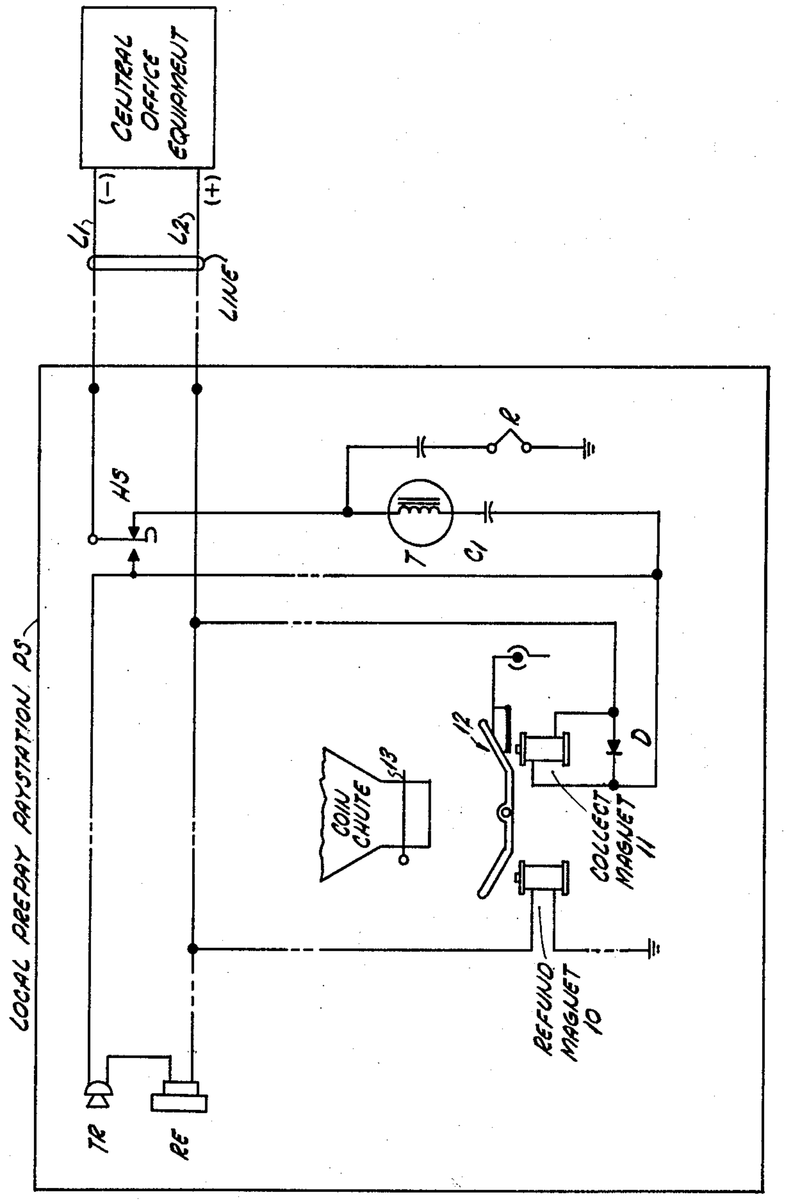

This invention relates in general to telephone paystations and in particular to paystations of the local prepay type. Its principal object is to provide a new and improved paystation of the above character which is arranged for charge-exaction on delayed calls and collect calls to the paystation.

In known paystations of the prepay type, common equipment is provided for groups of paystations. This common equipment is arranged to provide the necessary supervision and control over calls originating from and terminating at a prepay paystation. Recently, a new type of paystation has been introduced into the telephone field wherein the common control equipment for paystation lines is replaced by individual paystation line circuits. These newer types of paystations are termed local prepay paystations.

One of the major differences between a regular prepay paystation and a local prepay paystation is concerned with modifications in the refund and collect magnets and mechanisms. More specifically, a regular prepay paystation has the two coin control magnets serially connected to provide a polarized coin control mechanism. An example of such types of prepay paystations is disclosed in U.S. Patent No. 2,974,199, issued March 7, 1961, to John I. Bellamy. The noted local prepay paystations have the refund magnet separated from the circuit of the collect magnet. The refund magnet of the local prepay paystation is arranged to operate in response to a pulse of voltage in excess of 100 volts while the collect magnet of the local prepay paystation is polarized and arranged to operate in response to a reversal of the exchange battery.

This individual control of the two magnets simplified the paystation control circuit in the central office and thus enhances the use of the noted individual paystation line circuit. These individual paystation lines are more economical than common control equipment and also have the advantage of flexibility in that they may be assigned to any line and may be readily shifted to meet variations in traffic and address changes.

While these local prepay paystations find wide application in the telephone field as a result of the advantages above pointed out, they have the disadvantage that they are not adaptable to handling a delayed call from an operator or to handle collect calls to the paystation. A delayed call arises when a subscriber obtains the assistance of an operator in placing a call and the operator cannot complete the call at that time. The subscriber is asked to replace the handset and wait for the operator to call back. When the operator finally reaches the called party, the operator then calls the originating subscriber. This call to the subscriber in response to a request by the subscriber is termed a delay call. If the subscriber is using a paystation, the necessary coins must be deposited to pay for the call.

On collect calls to a paystation, the answering party is requested to pay the cost of the call to the paystation by depositing the necessary coins.

This disadvantage that local prepay paystations cannot handle these types of calls arises from the fact that the coin collect magnet mechanism is returned to its normal position on the completion of every call. Thereafter, on a delayed call from an Operator, the coin collect mechanism cannot collect the coins required for such a toll call. Similarly, when a collect call is made to the paystation, the deposited coins will not be collected since the coin mechanism is in its normal position. Numerous arrangements have been proposed for overcoming this disadvantage but they are complex and costly.

According to the present invention, the foregoing disadvantages are overcome by conditioning the coin mechanism of the paystation to collect all coins deposited when a delayed call or collect call is extended thereto. This is accomplished by directing a portion of the ringing current to the coin collect magnet and operating it into the collect position. Any coins thereafter deposited are collected by the paystation as intended. This arrangement is effective on all calls to the paystation, but the operation of the collect magnet is of no consequence on normal calls since no coins are deposited in the paystation.

A feature of the invention is concerned with the circuit arrangement for connecting the collect magnet into circuit relationship with the line conductors without adversely affecting the line relay normally connected to such conductors. This is accomplished by connecting the collect magnet across the line conductors through a large capacity condenser to prevent the flow of direct current thereover when the paystation is not in use.

Another feature concerned with this circuit arrangement relates to the use of "click" suppressing means for overcoming transients generated by charges collected on the noted large capacity condenser.

Other objects and features of the invention will become apparent and the invention will be best understood when the specification is read in conjunction with the accompanying drawing which discloses a simplified circuit diagram of the essential portions of a typical local prepay paystation modified according to the invention.

Referring now to the drawings, a detailed description of the invention will be given.

The local prepay paystation PS embodying the invention is shown connected to central office equipment by telephone line conductors L1 and L2. The paystation PS is shown in simplified form only and includes a transmitter TR, a receiver RE, a hookswitch HS and a ringer R. Also, the coin collecting apparatus is shown in simplified form and discloses a coin chute having the conventional unlatching mechanism 13, a refund magnet 10 and a collect magnet 11. Coin collecting mechanism 12 is shown associated with magnets 10 and 11 and is subject to actuation by operation of either magnet. The coils of the magnets 10 and 11 are associated with the line conductors L1 and L2 in a circuit arrangement to be described hereinafter.

As is well known, coins which are deposited in the paystation are directed into a coin chute and are held in temporary storage by mechanism 12 until either of the magnets 10 or 11 is operated to dispose of the coins.

The operation of the refund magnet 10 results in coins previously deposited in the coin assembly 12 being released and directed into the well-known paystation refund chute. Following each operation of the refund magnet the coin-collecting mechanism 12 is returned to its normal position in preparation for receiving and temporarily storing additional coins.

The operation of collect magnet 11 results in the coin mechanism 12 causing the deposited coins to be directed into the paystation strong box which is usually located within the confines of the paystation. Mechanism 12 includes conventional latching means for maintaining the coin mechanism in its collecting position so that any additional coins deposited after magnet 11 is operated are directed into the paystation strong box. Subsequent energization of the refund magnet 10 unlatches the coin mechanism 12 and moves it into refund position. Following the termination of the energization of the refund magnet, the coin collecting mechanism 12 is returned to its normal holding position.

The above-described operations of the coin mechanism in response to energization of the coin collecting magnet is typical of the local prepay paystations used in the telephone field.

The operation of the coin collecting mechanism in handling various types of situations in initiating, establishing and receiving calls will now be given:

When a subscriber removes the handset from a prepay paystation, a proper number of coins must be deposited before the paystation is conditioned to initiate a call. As is well known, the deposited coin or coins actuate unlatching mechanism 13 associated with the coin chute. The actuation of this mechanism results in the closing of a line loop across the line conductors L1 and L2, resulting in the seizure of central office equipment and the subsequent return of dial tone to the subscriber. The deposited coins are gathered and held within the confines of coin mechanism 12. Collect magnet 11 does not operate as it is polarized in the opposite direction from the line loop current by diode D.

In the event the subscriber disconnects prior to the dialing of the required digits or prior to the answering of the call, operations occur in the central office equipment to momentarily place a negative 110 volts on line conductor L2. This voltage is extended to ground through to the winding of refund magnet 10. Refund magnet 10 operates and releases the noted deposited coins into the return chute. Thereafter, the 110 volts negative potential is removed from conductor L2 and refund magnet 10 restores to normal. The paystation is now in condition for receiving additional coins preparatory to initiating another call.

In the event the call to the desired party was completed, the well-known central office operation in reversing the battery supply to the calling loop takes place. This reverse battery appears across the winding of collect magnet 11 and diode D to cause collect magnet 11 to operate. The operation of collect magnet 11 results in the deposited coin being directed into the strong box of the paystation. As previously noted, the collect magnet is latched in its operated position and any coin subsequently deposited will be collected.

The foregoing operations of the collect magnet take place responsive to answer by the called party and thus the collect magnet is latched in its operated condition for the duration of the conversation. When the conversation is terminated and the handset is returned to hookswitch HS, operations occur in the central office quipment as hereinbefore noted to place the 110 volts negative potential momentarily on the line conductor L2. This results in the unlatching of collect magnet 11, operation of refund magnet 10 and the return of the coin mechanism 12 to normal. The paystation is now in condition for receiving coins for subesquent calls.

In the event the call is to an Operator, the usual CLR circuit momentarily places a negative 110 volts on line conductor L2, causing the operation of refund magnet 10 and the return of the deposited coin or coins to the subscriber. Thereafter, the CLR circuit reverses the battery across the L1 and L2 conductors causing the operation of collect magnet 11 and the consequent latching thereof in the operated position.

If the noted Operator call is for information purposes only, the disconnect by the paystation user results in the noted negative potential appearing on the conductor L2 to operate the refund magnet and reset the coin mechanism 12. The paystation is then in condition to receive another call.

In the event the noted Operator call was to place a toll call, the mechanism 12 is in the collect position and all coins deposited as payment for the long distance call are directed into the paystation strong box. After completion of the toll call and disconnect by the paystation user, the refund magnet 10 is operated and the mechanism 12 is reset.

In none of the foregoing described examples has the thermistor T and condenser C1 been described. During the initiation of each of the described types of calls, the hookswitch maintains these elements out of circuit with the paystation.

The invention will now be described with reference to (1) handling collect calls being directed to the paystation from another subscriber, and (2) handling delay call situations.

According to prior art arrangements, the noted collect call and delayed calls could not be handled since the coin mechanism is in its normal position and no provisions are available for operating the collect magnets. To overcome this disadvantage, central office equipment has been provided to effect a reversal of battery across the line conductors to condition the collect magnet for acceptance. As previously noted, these arrangements are complex and costly.

According to the present invention, the paystation is modified by the addition of a thermistor device T and condenser C1 to condition the collect magnet for operation in response to either the collect call or delayed call.

When a collect call is directed to a paystation PS, coin mechanism 12 is in its normal position. Ringing current, which appears across line conductors L1 and L2, extended through the back contacts of hookswitch HS and across thermistor T, condenser C1 and the winding of collect magnet 11. Diode D rectifies this ringing current and causes the operation of collect magnet 11 which latches into its operated condition. Thereafter, any coins deposited in the paystation in response to the Operator's instructions are directed into the paystation strong box. The subsequent replacing of the handset on the hookswitch HS results in the noted operation of refund magnet 10 and the resetting of coin mechanism 12.

In the event the called paystation does not answer in response to the ringing signals directed thereto on a collect or relayed call, disconnect by the calling party or Operator controls equipment in the central office to transmit a negative 110 volts potential over conductor L2. As above described, this potential results in the reset of the coin mechanism 12.

Delayed calls are handled in an arrangement similar to that for collect calls.

Condenser C1 functions to isolate the usual direct current potential appearing on the line conductors from operating the collect magnet 11. While this condenser is shown in the preferred embodiment, other devices such as thyratrons, rare gas relays or electrical trigger circuits could be used to perform the same function.

Thermistor T is provided to suppress the "click" resulting from the charge remaining on condenser C1. This thermistor offers a high resistance to the initial current but assumes a low resistance condition in response to the heat generated by the current flowing therethrough. Thus, thermistor T acts as a delayed resistance circuit.

It is to be understood that the above-described modification of the paystation to receive collect and delayed calls could be accomplished without this thermistor or with a suitable resistor substituted therefor. However, to provide a high quality of service, the noted thermistor is used.

The modification according to this invention discloses the addition of the two described elements T and C1 to existing paystations without any other wiring changes. Variations utilizing the ringing current to condition the refund magnet and different specific circuitry could be employed without departing from the spirit of the invention.

While the principles of the inveniton have been described above in connection with specific apparatus and applications, it is to be understood that this description is made only by way of example and not as a limitation on the scope of the invention.

We claim:

1. A prepay paystation telephone set for initiating and receiving telephone calls over a transmission line interconnecting said set with a central office, coin depository means in said set for receiving coins to condition said set for initiating a call and for payment of telephone call fees, said depository means having a normal position and a collect and a refund position, coin collect means and coin return means operable responsive to control over said line for selectively operating said depository means to its collect and refund positions to collect or refund said deposited coins, means for returning said depository means to its said normal condition responsive to the completion of each call to and from said set, and means including current limiting means and a polarized collect magnet responsive to alternating current from said central office indicative of a call to said set for operating said depository means to its said collect position in preparation for collecting subsequently deposited coins.

2. A prepay paystation telephone set for initiating and receiving telephone calls over a transmission line interconnecting said set with a central office, coin depository means in said set for receiving coins to condition said set for initiating a call and for payment of telephone call fees, said depository means having a normal position and a collect and a refund position, coin collect means and coin return means operable responsive to control over said line for selectively operating said depository means to its collect and refund positions to collect or refund the said deposited coins, means for returning said depository means to its said normal condition responsive to the completion of each call to and from said set, and coupling means including current limiting means and a polarized collect magnet for connecting said collect means to said transmission line when said set is in an unoperated condition for operating said depository means to its said collect position in preparation for collecting subsequently deposited coins in response to calling signals consisting of ringing current from said central office indicative of a call to said set.

3. A prepay paystation telephone set as claimed in claim 2 wherein said current limiting means includes means for passing alternating current signals and for blocking direct current signals.

4. A prepay paystation telephone set as claimed in claim 2 wherein rectifier means is included in said coupling means for rectifying said calling signals.

5. A prepay paystation telephone set as claimed in claim 2 wherein said current limiting means includes condenser means in series circuit relationship with said collect means.

6. A prepay paystation telephone set as claimed in claim 5 wherein said current limiting means includes an impedance device for suppressing voltage transients in the said coupling means.

7. A prepay paystation teelphone set as claimed in claim 5 wherein said current limiting means comprises a thermistor.

8. A prepay paystation telephone set for initiating and receiving telephone calls over a transmission line interconnecting said set with a central office, coin depository means in said set for receiving coins to condition said set for initiating a call and for payment of telephone call fees, said depository means having a normal position and a collect and a refund position, coin collect means and coin return means operable responsive to control over said line for selectively operating said depository means to its collect and refund positions to collect or refund the said deposited coins, means for returning said depository means to its said normal condition responsive to the completion of each call to and from said set, coupling means including current limiting means and a polarized collect magnet for connecting said collect means to said transmisison line when said set is in an unoperated condition for operating said depository means to its said collect position in preparation for collecting subsequently deposited coins in response to calling signals consisting of ringing current from said central office indicative of a call to said set, said coupling means including means for passing said calling signals to said collect means and for blocking other signals appearing on said line.

9. A prepay paystation telephone set for initiating and receiving telephone calls over a transmission line interconnecting said set with a central office, coin depository means in said set for receiving coins to condition said set for initiating a call and for payment of telephone call fees, said depository means having a normal position and a collect and a refund position, coin collect means and coin return means operable responsive to control over said line for selectively operating said depository means to its collect and refund positions to collect or refund the said deposited coins, hookswitch means having an off-hook and an on-hook position corresponding respectively to the operated and non-operated condition of said set, means for returning said depository means to its said normal condition responsive to the said hookswitch means being placed in its on-hook position, and means including current limiting means and a polarized circuit magnet responsive to ringing current from said central office when said hookswitch means is in its on-hook position for operating said depository means to its said collect position in preparation for collecting subsequently deposited coins.

10. A prepay paystation telephone set as set forth in claim 9 wherein said means for operating said depository means to its collect position includes means for coupling said collect means to said transmission line and wherein said hookswitch means in its off-hook position disables said coupling means.

References Cited by the Examiner

UNITED STATES PATENTS

| | | | |
|---|---|---|---|
| 2,179,826 | 11/39 | May | 179—190 |
| 2,332,872 | 10/43 | Shann | 179—190 |
| 2,883,462 | 4/59 | Dimmer | 179—6.3 |
| 2,908,757 | 10/59 | Lomax | 179—6.3 |
| 2,955,161 | 10/60 | Faulkner | 179—6.3 |
| 3,048,660 | 8/62 | Andregg | 179—6.3 |

ROBERT H. ROSE, *Primary Examiner.*

WALTER L. LYNDE, *Examiner.*